May 29, 1956 T. L. FISCHER 2,748,375

CALIBRATION DEVICE

Filed June 21, 1952 5 Sheets-Sheet 1

INVENTOR.
THOMAS LEE FISCHER

BY

Ostrolenk & Faber

ATTORNEYS

May 29, 1956 — T. L. FISCHER — 2,748,375

CALIBRATION DEVICE

Filed June 21, 1952 — 5 Sheets-Sheet 2

INVENTOR.
THOMAS LEE FISCHER

BY

Ostrolenk & Faber
ATTORNEYS

May 29, 1956 T. L. FISCHER 2,748,375

CALIBRATION DEVICE

Filed June 21, 1952 5 Sheets-Sheet 3

INVENTOR.
THOMAS LEE FISCHER

BY

Ostrolenk & Faber

ATTORNEYS

INVENTOR.
THOMAS LEE FISCHER
BY
Ostrolenk & Faber
ATTORNEYS

INVENTOR.
THOMAS LEE FISCHER
BY
Ostrolenk & Faber
ATTORNEYS

United States Patent Office 2,748,375
Patented May 29, 1956

2,748,375

CALIBRATION DEVICE

Thomas Lee Fischer, South Gate, Calif., assignor to Standard Coil Products Co., Inc., Los Angeles, Calif., a corporation of Illinois Application June 21, 1952, Serial No. 294,801

3 Claims. (Cl. 340—187)

The present invention relates to radiosonde equipment and more particularly it relates to the calibration of radiosonde units.

As is well-known in the art, radiosonde units are used to record variations in pressure, temperature and humidity. In one type of radiosonde unit, these variations cause a needle to move from one groove to another on a rotating recorded disc, production, therefore, in the equipment connected to the needle an electrical signal which serves to indicate in what particular groove the needle is positioned.

Considering pressure, for example, a groove may correspond to 250 millibars pressure while the one immediately adjacent may correspond to 255 millibars. In other words, the pressure variation from one groove to another of a radiosonde disc is discontinuous.

The major problem arising in radiosonde equipment is one of accuracy since the tolerance to which the manufacturer must conform is quite exacting.

Because of the discontinuity in pressure from one groove to an adjacent one, the problem becomes one of determining exactly at what pressure the reproducing needle will move from one groove to the next.

In the above example, the problem is, therefore, one of determining at what pressure between 250 and 255 millibars the needle will move from groove corresponding to 250 millibars to groove corresponding to 255 millibars. If the tolerance allowance is 5 millibars, then it is conceivable that if the change-over occurs not say exactly at 250 millibars but, for example, at 252 or 253 millibars, the tolerance allowance of 5 millibars between the two adjacent grooves is insufficient to make certain that invariably change-over occurs at 255 millibars of pressure.

It was, therefore, necessary to determine at what pressure exactly the reproducing needle moved from one groove to the one adjacent to it.

The present invention consists essentially of a memory device to permit the accurate determination of the pressure at which the reproducing needle moves from one groove to the next. This memory device will record the signals corresponding to the successive grooves as the radiosonde equipment under test is placed in a pressure chamber where the pressure is changed. The said change in pressure is also indicated by visual means.

More specifically, at a particular pressure the needle will be in a particular groove corresponding to that pressure and will, therefore, send coded signals corresponding to the particular groove and, therefore, to that pressure. As the pressure is increased, a point is reached at which the needle is moved from the groove in which it was located to the immediately adjacent one.

The particular pressure at which such a change-over occurs is visually observed at the same time that the change in coded signals indicates that the needle has moved to the next adjacent groove.

The coded signal is also recorded on a continuously moving tape. One revolution after the recording operation the recorded signal will be picked up by a pick-up head from the original recording.

Thus, if at the instant of change-over a played back signal which differs from the recording at that moment being made by the needle now in the next adjacent groove is seen, that difference is observed by two amplifier circuits, each of which has impressed on the input side thereof the signals, one from the recording head and one from the pick-up head. This difference indicates the particular pressure at which the change-over is to take place.

The main object of the present invention is, therefore, a memory device which permits a calibration of radiosonde units.

A more specific object of the present invention is the provision of means whereby coded signals are compared by means of electric circuits to determine the particular pressure at which a reproducing needle in radiosonde units is moved from one groove to the immediately adjacent one.

The tape is moved by means of synchronous motor, and if an eight-channel radiosonde calibration device is used, eight such motors will be needed, all operating synchronously.

It is then necessary to provide the calibration device with synchronous amplifiers for driving these synchronous motors, the amplifiers being operating by induction pick-up devices.

Accordingly, another object of the present invention is a synchronous amplifier for driving synchronous motors of the novel calibrating device.

The novel radiosonde calibration device is also equipped with a dial indicator for visually showing the pressure existing in the pressure chamber in which the calibration tests take place. Furthermore, the novel radiosonde calibration device is provided with a follow-up system to closely follow the variation in height of the mercury column used as a pressure measuring device in the calibration equipment. The follow-up system makes it possible for the pressure recording equipment to follow closely variations in the height of the mercury column measuring pressure variations.

In addition, I have provided a motor for compensating for changes in pressure in the ambient in which one part of the pressure measuring mercury tube is located.

The dial indicator may be of any known type while the follow-up system operates on the principle that a coil will have different value of inductance depending on the amount of mercury positioned in the interior of the coil.

To be more specific, the pressure measuring mercury tube is provided near the meniscus of the mercury with an oscillator coil wound around the tube containing the mercury. Variations of the mercury height in its tube cause a corresponding variation in the inductance of the oscillator coil, thus causing the oscillator to operate at values of frequencies, function of the amount of mercury in the oscillator coil.

The oscillator which then operates as a frequency modulating device is followed by an amplifier and a suitable detector which transforms frequency deviations caused by the motion of the mercury column in its tube into signals which are amplified by a system of amplifiers and used to drive a motor. This motor is coupled by means of gears to a lead screw carrying at its other end the previously mentional carriage on which the oscillator is mounted.

By this time, it is possible to have the carriage follow closely any variation in height of the mercury column where these variations may be observed at the same time on the pressure dial indicator.

To compensate for eventual changes in pressure in the ambient where one part of the mercury column is located, an ambient compensator motor is provided to move the mercury tube vertically and thus compensate for changes in the height of the mercury column due to changes in ambient pressure.

Accordingly, a further object of the present invention is the provision of means whereby the pressure recording equipment may follow closely variations in the height of the mercury column, measuring pressure variations.

Another object of the present invention is the provision of means for compensating for pressure variations in the ambient where a part of the pressure responsive device is located.

The foregoing and many other objects of the invention will become apparent in the following description and drawings in which.

Figure 1:
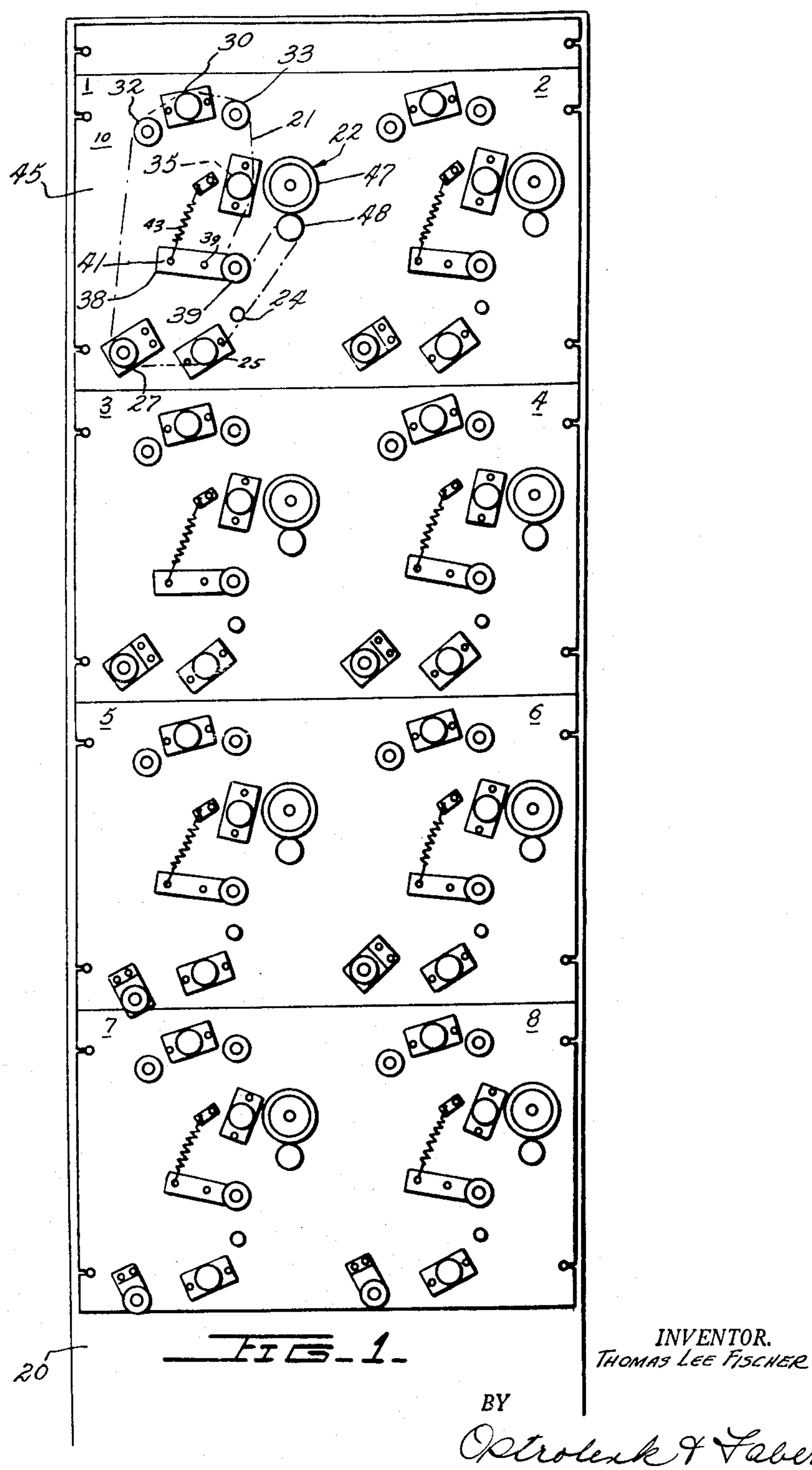
Figure 1 is a front view of the magnetic tape recorders used in the radiosonde equipment of the present invention.

Referring first to Figure 1 showing the eight tape recorders 10–17 used in the eight channel radiosonde calibration equipment of the present invention, each of these eight tape recorders is a memory device and is connected to a common power supply 20, each memory device being provided with a selsyn motor amplifier described hereinafter.

Although in the present example eight memory devices, in other words eight tape recorders, are used, calibration equipment having a different number of tape recorders may also be constructed.

The present description will actually be limited to any one of these eight tape recorders and their associated circuit, it being understood, of course, that the other tape recorders for the radiosonde calibration equipment will be of a similar nature.

Referring now to tape recorder 10, which is the first of the eight tape recorders shown in Figure 1, tape 21 is pulled by means of drive motor 22 which is a synchronous motor and the operation of which will be described hereinafter in connection with Figure 5.

As the tape is moved by driving motor 22, it passes in front of the permanent magnet erase head 24 and then to the record head 25. From record head 25 it passes through an adjustable idler 27. Idler 27 is adjustable in order to permit eventual adjustments of the length of the tape 21 existing between recording head 25 and play back head 30.

From idler 27 tape 21 will pass over a second idler 32 having as its only function that of causing tape 21 to approach the first play back head 30 at a preselected correct angle.

Tape 21 as previously mentioned will then pass over first the play back head 30 and thence over another idler 33 which also provides the correct angle for tape 21 in order that tape 21 may pass through the second play back head 35 at a correct angle.

This second play back or pick-up head 35 is provided in the magnetic recorder 10 for the sole purpose of converting the code information on the tape into an operation of a relay which as hereinafter described will record it on a piece of paper tape.

From the second pick-up head 35, tape 21 flows over a spring loaded idler 37 which serves to keep a constant pressure on tape 21 at all times and keeps it in close contact wtih the various heads 24, 35, 30 and 35 so that there is a substantially uniform magnitude of signal coming from the heads for a given signal on the tapes.

Idler 37 is mounted on a lever arm 38 pivoted at 39 and provided at its opposite end 41 with a spring 43 secured at its other end to the surface 45 of the tape recorder 10. Spring 43 will bias lever 38 in the clockwise direction causing, therefore, a tension on tape 21 through idler 37 to keep, as previously mentioned, tape 21 in good contact with the various heads.

Tape 21 will then flow over the driving wheel 22 again and repeat the complete cycle. Tape 21 is a carefully made splice using cyclohexanone, obtaining, therefore, a continuous tape which was cemented on its two ends rather than attached by means of an adhesive stretchable material.

The driving mechanism 22 for tape 21 consists actually of an idler 47 and shaft 48 of a synchronous or selsyn motor (not shown). Tape 21 is engaged between shaft 48 and the rim of roller 47 so that a rotation of shaft 48 will be accompanied by an opposite rotation of roller 47 and consequent advancing of tape 21.

The length of tape 21 is not critical since tape 21 is running synchronously and the cycle at which it operates has nothing to do with the time it takes for tape 21 to complete its complete circuit from the driving mechanism 22 through the various heads and idlers and back to driving mechanism 22. But the length of tape 21 must be enough so that tape 21 does not complete the tape motion cycle before the record play back cycle is completed. Tape 21 may, of course, be longer than the above-mentioned minimum.

As tape 21 moves in front of erase head 24, all information previously recorded on tape 21 will be erased. Then new information in the form of dashes and dots will be recorded on tape 21 by recording head 25 in a manner hereinafter described in connection with Figure 2.

Thence, tape 21 will pass through first play-back head 30 where the information recorded by recording head 25 is played back to permit a comparing action between two signals, one being presently played back by first play back head 30 and the other being produced at that particular time at the recording head 25. This comparing action which will be described hereinafter will operate a system of relays to give information as to what particular pressure is present at the time of a groove change-over as described more in detail hereinafter.

Figure 2:
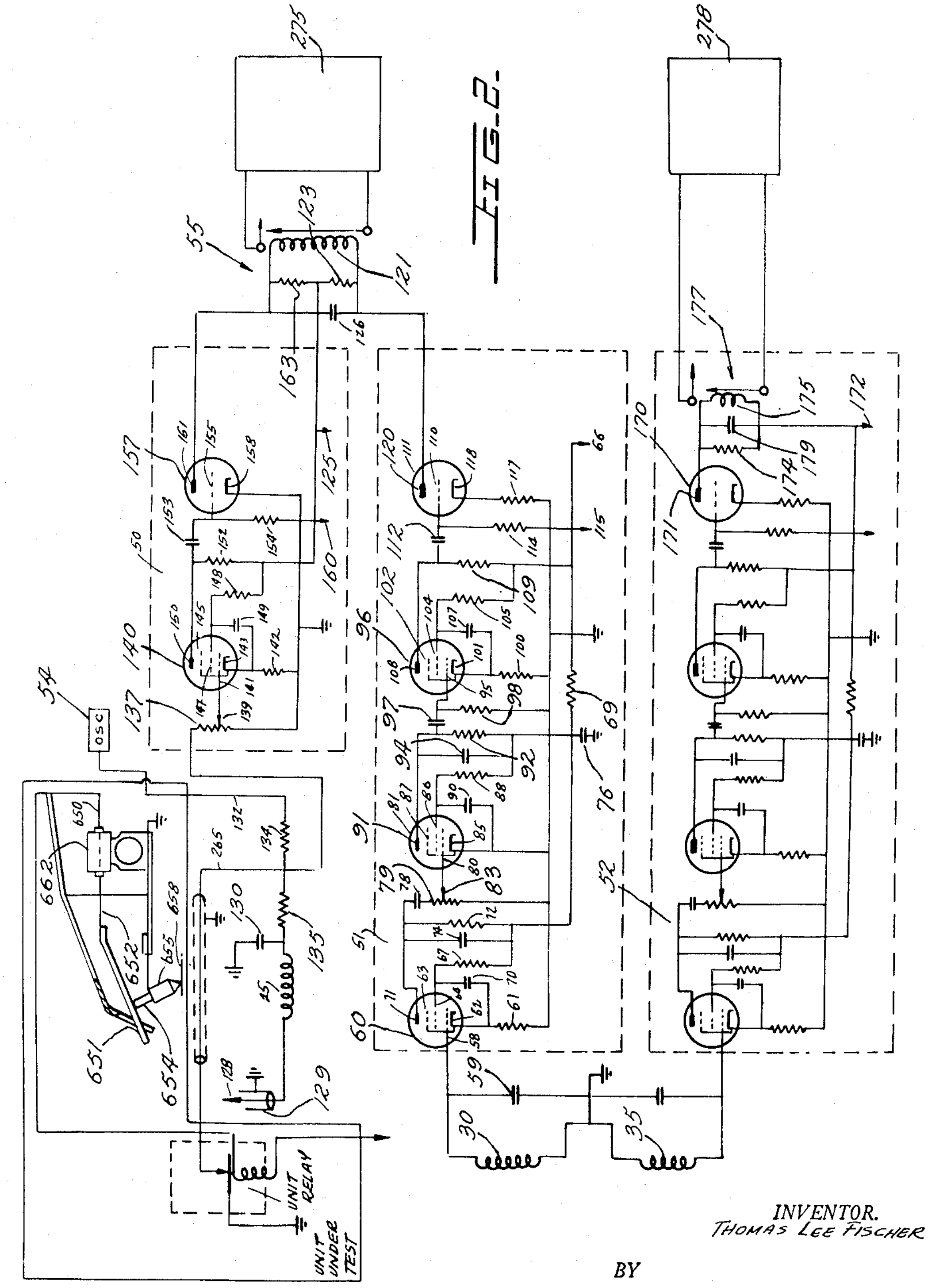
Figure 2 is a schematic diagram showing one of the eight channels of the novel radiosonde calibrating equipment of Figure 1.

Referring now to Figure 2, it is necessary to point out that to each of the tape recorders 10–17 corresponds an electrical circuit similar to the one shown in Figure 2. In Figure 2 the electrical circuit of the comparing system consists essentially of a recording amplifier 50, a first play back amplifier 51 and a second play back amplifier 52. Recording amplifier 50 is connected as described hereinafter to operate relay 65 from the signal going to the previously mentioned recording head 25, while the first play back amplifier 51 is connected to the first play back head 30 and the second play back amplifier 52 is connected to the second play back head 35.

Both recording amplifier 50 and first play back amplifier 51 have their output connected to a comparing relay 55 which performs the operation previously mentioned.

More specifically, referring to first the play back amplifier 51, the first play back head 30 shown as an inductance in Figure 2 is shunted by an appropriate capacitor 57 which resonates with inductance 30 at a certain preselected frequency. The choice of this preselected frequency must be made very carefully in that the circuits used in the play back amplifier 51 must be such as to attenuate all high frequency signals, signals that may be produced and fed into circuit 51 by the bias oscillator described hereinafter which would otherwise cause operation of relay 55 and all the other relays similar to relay 55 to produce erroneous indications.

It is, therefore, necessary to use circuits in play back amplifier 51 of considerably high frequency attenuation. On the other hand, there will be present in the circuit frequencies of the order of 60 cycles, 120 cycles and multiples of 60 cycles coming from power supply 20 (see Figure 1) and other low frequencies between 80 to 100 cycles per second from the selsyn motors (not shown) mounted on each tape recorder 10–17.

These low frequency signals from the selsyn motors are radiated into the record heads 25 and the playback heads 30 and 35 giving considerable erroneous information through the relay circuits.

Completely shielding heads 30 and 35 amounts to a very expensive and quite unnecessary operation since it was found that it was possible to operate the novel tape recorder at an optimum frequency positioned between the high and the low frequency end, for example, 525 cycles per second, and then cause all the circuits of amplifiers 51 and 52 to considerably attenuate at the low and the high ends of the frequency spectrum, for example by approximately 30 or 40 db for frequencies below 70 or 80 cycles and by a similar amount of attenuation by frequencies above 5,000 cycles.

It is also well-known in the art that efficient tape recording is obtained only when an alternating biasing flux is used and in this particular embodiment the bias frequency is chosen to be 35 kilocycles although this particular value is not imperative in the use of our radiosonde calibrating equipment.

It is also known in the art that information can be applied to a tape only at a certain number of cycles per lineal inch of tape since otherwise the information recorded would become so congested that there would be considerable difficulties in picking up the information recorded there clearly. In other words, there is an upper limit to the frequency that one can use on the tape as wave length of the sound as recorded on the medium ceases to be large with respect to gap width of heads 25.

As previously mentioned, the frequency used in the present embodiment is 525 cycles although any other frequency which may still permit good attenuation of the interference signals may be successfully used in the novel calibration equipment.

Because of the particular choice of 525 cycles per second frequency, capacitor 57 connected in parallel to the pick-up head 30 will have to resonate with inductance 30 at that particular frequency, 525 cycles per second.

This signal is then applied to the grid 58 of a first amplifier 60. First amplifier 60 is here a pentode tube, for example a 6AG5, having resistor 61 connected to the cathode 62 of tube 60. Suppressor grid 63 is connected to cathode 62 while screen grid 64 is connected to the D. C. power supply 66 through dropping resistances 67 and 69. Screen grid 64 is by-passed to cathode 62 of tube 60 by means of by-pass capacitor 70. Plate 71 is connected to the same power supply 66 through load resistor 72 and thence dropping resistor 69. Dropping resistor 72 is by-passed at high frequencies by capacitor 74. Another capacitance 76 is connected between resistance 69 and ground to prevent positive feedback from occurring between alternate amplifier stages through the power supply 20.

It was found that for the frequency used in my radiosonde calibration device, 525 cycles per second, a relatively low value of screen by-passing capacitance 70 is suitable. It was found, in fact, that a value of the order of .01 microfarad is most successful.

Both capacitors 76 and 94 in the plate circuits of tubes 60 and 81 serve to attenuate the high frequencies passing through them.

The amplified signal from first amplifier 60 is applied through an R. C. coupling network consisting of capacitance 78 and resistance 79 into the grid 80 of second amplifier 81.

It is to be noted that since the signal from head 30 is to be compared with the signal coming from the recording head 25, it will be necessary to adjust the magnitude of the signal from play back amplifier 51. In order to achieve that, resistance 79 will not be at constant resistance but will actually be a potentiometer with its movable tap 83 connected to the grid 80 of tube 81. Potentiometer 79, in other words, makes possible gain control of amplifier 51 and, therefore, variation of the signal reaching relay 55 from play back amplifier 51.

The circuit of second amplifier 81 is similar to that of first amplifier 60.

Suppressor grid 87 is connected to cathode 85 and screen grid 86 is connected through dropping resistance 88 to power supply 66 through the previously mentioned dropping resistance 69. Screen grid 86 is by-passed to cathode 85 through capacitance 90. Plate 91 is connected to the power supply 66 through load resistor 92 and dropping resistance 69 and by-passed by capacitance 94. The amplified signal from second amplifier 81 is then applied to the grid 95 of a third amplifier 96 through an R–C circuit consisting of a coupling capacitance 97 and a leak resistance 98 connected between grid 95 of tube 96 and ground.

Tube 96 again is self-biased by means of resistance 100 connected between cathode 101 and ground and its screen grid 102 is connected to the same cathode 101. Screen grid 104 of tube 96 is connected to power supply 66 through dropping resistance 105 and by-passed by capacitor 107. Plate 108 of tube 96 is connected to power supply 66 through the loading resistance 109.

It is well-known in the art that blocking capacitors 78 and 98 may be selected so that they will attenuate the low frequencies so that amplifier 96 will amplify only frequencies around the preselected value of 525 cycles per second. Amplifier 96 produces at its output resistor 109 very large signals which are applied to the grid 110 of output tube 111 through an R–C coupling circuit consisting of capacitance 112 and resistance 114.

Tube 111 is biased by means of a negative biasing supply 115 which serves to bias tube 111 slightly beyond cut-off when no signal is applied to grid 110. In the present example the negative bias used in connection with the tube 6C4 is 35 volts obtained from power supply 20 which is, therefore, the main power supply from which D. C. voltages 66 and 115 of amplifier 51 may be obtained.

Tube 111 is also provided with an amplitude leveling resistance 117 connected to its cathode 118 and ground. The plate 120 of tube 111 is connected to one side of coil 121 of relay 55.

Plate 120 of amplifier 111 is also connected through load resistor 123 to the power supply terminal 125, also part of the previously mentioned power supply 20.

Relay coil 121 is shunted by a capacitance 126. Capacitance 126 serves to filter as much as possible the signal output from tube 111. Its magnitude, on the other hand, cannot be too large since it has to respond to a fairly rapid code. In other words, the time constant of the circuit to which capacitance 126 is connected must be fairly small. The value of capacitance 126 must, therefore, be a compromise between a very large value for perfect filtering and a very small value for a small time constant.

Play back heads 30 are usually mass produced and their response is definitely not uniform. In order to make the varying signals produced by these heads appear reasonably constant in the output stage, resistor 117 connected in the cathode circuit of tube 111 is chosen to provide a cathode bias so that when the plate current of tube 111 reaches a preselected maximum value because of the self-biasing action produced by resistor 117, the plate current flowing through tube 111 stops increasing.

By this means, in other words by means of capacitance 126 connected in shunt across relay coil 121 and biasing resistor 117 in the cathode circuit of tube 111, it is possible to obtain an output at relay 55 of considerable smoothness and of approximately constant amplitude regardless of the non-uniformity of the play back heads 30 used.

Referring now to the record amplifier 50, the radio frequency bias in this case of 35 kilocycles is applied at contact 128 shielded as shown at 129. The radio frequency bias of 35 kilocycles for this particular embodiment is produced by a radio frequency oscillator described hereinafter in connection with Figure 3.

Contact 128 is connected to the recording head 25 so that the high frequency bias may appear on recording head 25. Since it is desired to apply all of this bias frequency to the winding, a by-pass capacitor 130 is connected to recording head 25 and grounded. The audio signal which as previously mentioned was selected to have a frequency of 525 cycles per second is produced by an audio frequency oscillator described hereinafter in connection with Figure 4 and applied at contact 132.

Figures 3, 4:
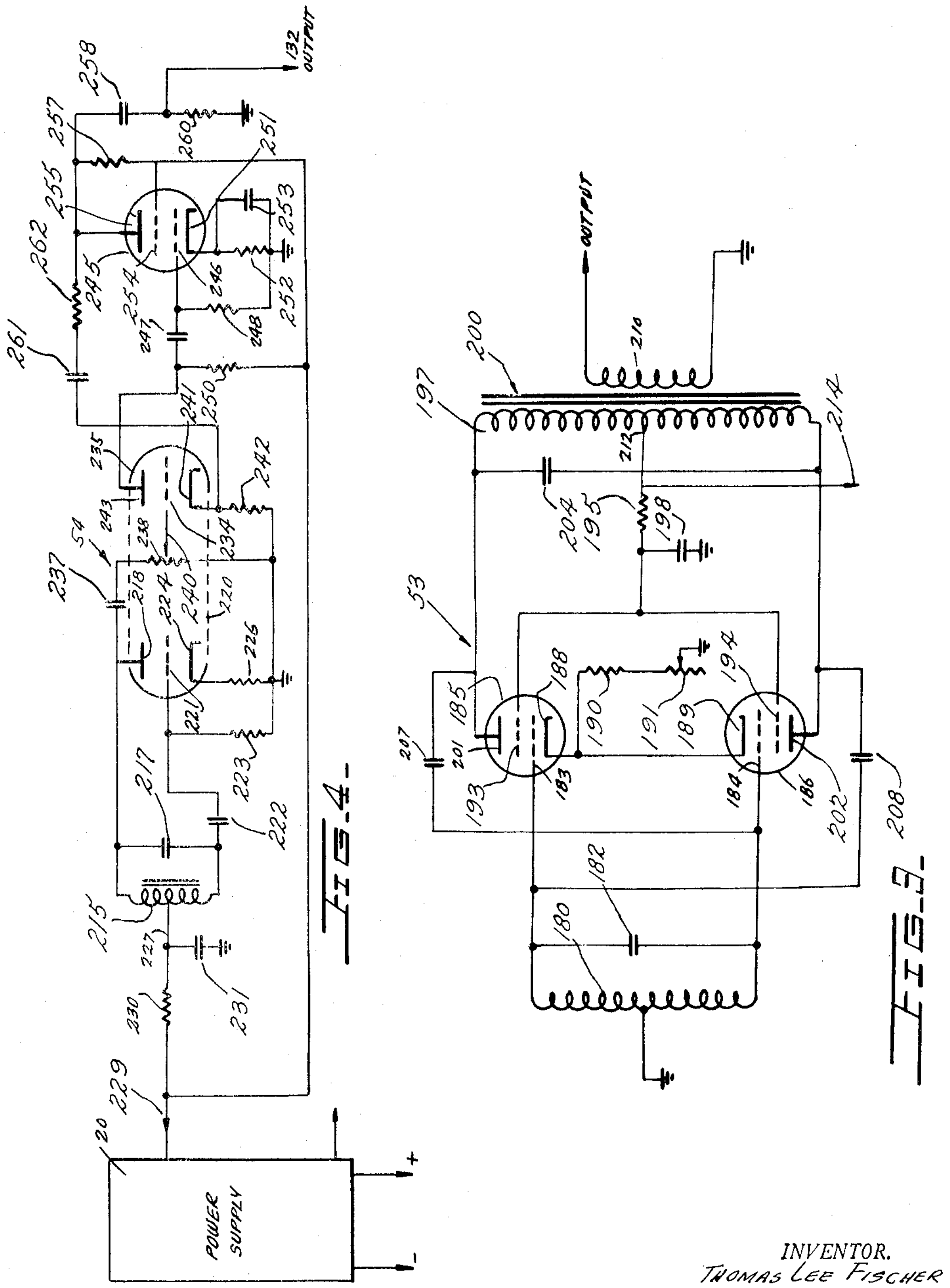
Figure 3 is a schematic diagram of the radio frequency oscillator for the radiosonde equipment of Figure 1.
Figure 4 is a schematic diagram of the audio oscillator for the radiosonde equipment of Figure 1.

Actually the audio frequency oscillator 54 shown in Figure 4 and as a block in Figure 2 is connected through lead and resistance 134 and 135 to head 25 when unit relay 661 is open. In the radiosonde unit under test, relay 661 is held closed by 3 volts D. C. applied through contact between 651 and 654. Heavy contact 651 is biased by means of a spring member 652 against a second and lighter contact 654 mounted on a stylus 655. Stylus 655 vibrates in one groove of a radiosonde recorded disc 658 so that it will oscillate vertically when responding to a dot or dash signal much too rapidly to permit the heavier contact 651 to follow closely the vibrations of the lighter contact 654.

Therefore, for the duration of the dot or dash where the dot corresponds to approximately eleven cycles for the audio signal used in this particular embodiment (approximately 400 cycles per second), there is a very large increase in the resistance of contact 651 and 654 due to the fact that they touch only approximately 10% of the time during modulation. Contact 654 is connected by means of wire 660 to complete relay 661 coil circuit through energizing voltage. This increase in resistance between contacts 651 and 654 allows relay 661 to relax. This may cause, depending on the type of service required, a plate voltage to be applied to the equipment or if the armature 662 of relay 661 is grounded as for testing only, then by proper operation of relay 661 caused by the variation in resistance between contacts 651 and 654, it is possible to short out by lead 265 the audio signal coming from the audio frequency oscillator 54.

The audio frequency signal is applied to head 25 of tape recorder 10 through the series combination of resistances 135 and 134. A portion of the incoming audio signal is applied to a resistance 137. Resistance 137 is connected between resistances 134 and 135 on one side and to ground on the other side so that only a portion of the audio signal appearing across the combination of resistances 134—135 will appear across resistance 137. Resistance 137 is also provided with a variable tap 139 so that it operates as a potentiometer to vary the input signal to tube 140 of record amplifier 50. Tap 139 of potentiometer 137 is connected to the control grid 141 of amplifier 140.

Tube 140 is self-biased by means of resistance 142 connected between cathode 143 and ground. Suppressor grid 145 is connected to cathode 143, while screen grid 147 is connected to D. C. voltage tap 125 through a dropping resistance 148 and by-passed to cathode by capacitance 149. Plate 150 of tube 140 is connected to the D. C. voltage tap 125 through load resistance 152.

The output from the tube 140 appearing across load resistance 152 is applied by means of an R–C circuit consisting of coupling capacitance 153 and leakage resistance 154 to the grid 155 of output tube 157. Output tube 157 has its cathode 158 connected to ground, while resistance 154 is connected to a negative bias tap 160 or in this particular case where a 6C4 was used as tube 157, the bias chosen was —35 volts. This bias is obtained also from the previously mentioned power supply 20.

Plate 161 of output tube 157 is connected to the other side of relay coil 121 and connected to the D. C. voltage supply 125 through load resistance 163.

It is thus seen that when an audio signal is applied to tap 132 from the audio oscillator described hereinafter in connection with Figure 4, this audio signal will be amplified by tubes 140 and 157 and applied to coil 121 of relay 55 with a polarity the same as the polarity of the signals coming from the play back amplifier 51 so that only the difference between the two signal voltages will appear across coil 121 of relay 55.

Figures 7, 8:
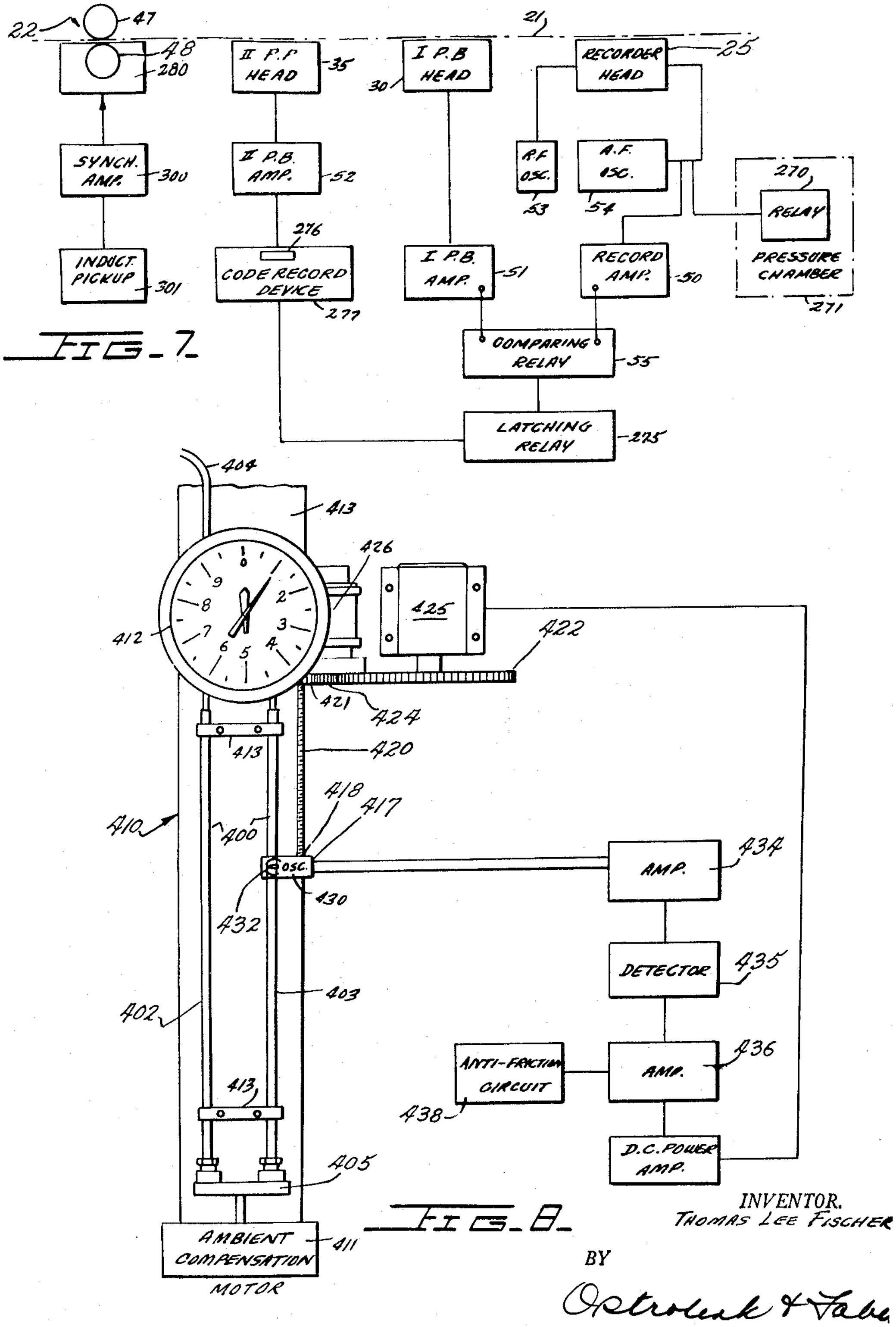
Figure 7 is a block diagram showing the relative positions of the heads and their associated circuit in our novel radiosonde calibration device.
Figure 8 is a front view of the manometer follow-up system of the present invention.

The operation of the above-described record and first play back amplifier 50 and 51 will be understood more clearly hereinafter in connection with the block diagram of the present invention as shown in Figure 7.

When tape 21 carrying the recorded signals from record head 25 reaches second play back head 35, a signal will be developed across head coil 35. Coil 35 is connected in the input circuit of the second play back amplifier 52 which is similar in all its electrical components to the first play back amplifier 51 except for the output circuit of output tube 170.

Plate 171 of tube 170 is, in fact, connected to a D. C. voltage tap 172 through a load resistance 174. Plate 171 is also connected to the coil 175 of keying relay 177. Coil 175 of relay 177 is shunted by a capacitance 179 which serves the same purpose as capacitance 176 in relay 155, that is, to filter out the high frequency component of the signal reaching coil 175 of relay 177.

As previously mentioned, play back head 35 through second play back amplifier 52 serves to operate keying relay 177 and, therefore, to produce on a paper tape (not shown) the signals recorded on tape 21 by recording head 25.

It may seem that second play back head 35 and its associated amplifier 52 could be dispensed with and that a relay could be used on the output of first play back amplifier 51 connected to the first play back head 30. However, by the time a change in groove of the needle has been detected in many cases most of the coded signals have already passed first pick-up head 30 and would naturally be lost to tape recorder 10 which is not actuated until, as hereinafter described, comparison by comparing relay 55 is indicated or until a coded signal group change is indicated by first play back head 30.

Thus, second play back head 35 and its associated amplifier 52 are entirely necessary and are spaced as seen in Figure 1 only a short distance from first play back head 30 in order to transcribe on a separate tape (not shown) the material that is on tape 21 before this material on tape 21 becomes erased and rerecorded.

Referring now to Figure 3 showing a schematic diagram of the radio frequency oscillator 53 for biasing the recording head 25 of tape recorder 10 mentioned in connection with Figure 2, a radio frequency choke 180 resonated by a capacitance 182 is connected at its two terminals to the grids 183 and 184 of oscillator tubes 185 and 186, respectively. Choke 180 is center tapped and the center tap is connected to ground.

The cathodes 188 and 189 of tubes 185 and 186, respectively, are connected to a cathode biasing resistance 190 connected to a second biasing resistance 191 where resistance 191 is the variable resistance having a movable contact connected to ground.

By means of resistances 190 and 191 it is, therefore, possible to vary the potential of cathodes 188 and 189 with respect to their grids 183 and 184 within a certain range, varying output. The oscillator tubes 185 and 186 have their screen grids 193 and 194 connected together and through a load resistance 195 to the center tap of primary 197 of output transformer 200. Screen grids 193 and 194 are shunted to ground through a capacitance 198.

Output transformer 200 has a ferrite core and is designed to be particularly efficient at the frequency involved, in other words, at 35 kilocycles for this particular embodiment. Primary 197 of transformer 200 has its terminals connected to the plates 201 and 202 of tubes 185, 186, respectively, and is resonated at the correct frequency by the shunting capacitance 204. Capacitances 207 and 208 connected between the plate 201 of tube 185 and the grid 184 of tube 186 and between plate 202 of tube 186 and grid 183 of tube 185, respectively, provide the necessary feed back path for this oscillator which from the above description is of the type commonly known as push-pull oscillator.

The secondary 210 of the output transformer 200 has sufficient turns to produce the required biasing voltage in the recording heads 25, the biasing voltage needed in this particular embodiment being approximately 50 volts at 35 kilocycles.

At the same time, secondary 210 must have a very low internal impedance at audio frequencies so that it would be essentially a short to ground as far as the audio signal, in this case 525 cycles per second, is concerned. The center tap 212 of primary 197 of transformer 200 is also connected to a D. C. voltage tap 214 also obtained from the previously mentioned power supply 20.

Radio frequency oscillator 53 serves to supply radio frequency bias to all the recording heads of this novel radiosonde calibrating equipment. In this particular embodiment it will have to supply eight recording heads similar to recording head 25 of tape recorder 10.

Referring next to Figure 4 showing a schematic diagram of the audio frequency amplifier 54 supplying an audio frequency signal, in this case 525 cycles per second, to the record amplifier 50 through the contact 132, an audio frequency coil 215 is hunted by a capacitance 217 to form a resonant circuit at the desired low frequency of 525 cycles per second in this particular case.

One side of the tank circuit 215—217 is connected to plate 218 of oscillator tube 200. The other side of tank circuit 215—217 is connected to the grid 221 of oscillator tube 200 through a capacitance 222. Grid 221 is also provided with a grid leak resistor 223 while cathode 224 of tube 220 is biased positive with respect to ground by means of cathode bias resistor 226 connected between cathode 224 and ground.

Coil 215 is center tapped at 227 and connected to D. C. voltage tap 229 of power supply 20 through a dropping resistance 230 and is shunted to ground by means of capacitance 231. Coil 215 can actually be a center tap winding of an audio frequency transformer.

The output from oscillator tube 220 is applied to the grid 234 of an amplifier 235 through an R–C circuit consisting of a coupling capacitance 237 and grid leak resistance 238 where coupling capacitance 237 is connected to plate 218 of tube 220 on one side and connected on the other side to the grid leak resistance 238. Grid leak resistance 238 is connected on its other side to ground.

Resistance 238 is provided with a movable tap 240 so that resistance 238 with tap 240 operates a potentiometer providing a variable input into amplifier tube 235. Cathode 241 of tube 235 is biased above ground by means of cathode resistance 242 connected between cathode 241 and ground.

The output from the plate 253 of tube 235 is applied to a power amplifier or output amplifier 245. More specifically, plate 243 of tube 235 is connected to grid 246 of tube 245 through an R–C coupling network consisting of capacitance 247 and grid leak resistance 248. Plate 243 is also connected to the D. C. voltage tap of power supply 20 through a load resistance 250.

Tube 245 has its cathode 251 biased above ground by means of resistance 252 by-passed by capacitance 253 so that a negative bias is provided between grid 246 and cathode 251 of tube 245. Screen grid 254 of tube 245 is connected directly to the D. C. voltage tap 229 of power supply 20 while plate 255 of tube 245 is connected to the D. C. voltage tap 229 of power supply 20 through a load resistance 257.

The audio output tap 132 is connected to plate 255 of tube 245 through a blocking capacitance 258 and to ground through a resistance 260. The output from tube 245 will, therefore, appear across resistance 260. Plate 255 of output tube 245 is connected also to the cathode 241 of tube 235 through an R–C series combination comprising a capacitance 261 in series with resistance 262 providing, therefore, an inverse feed back path. The need for such an inverse feed back will be appreciated by referring to Figures 2 and 4.

In Figure 2 a tap 265 is provided between resistances 134 and 135 across which the audio signal from audio oscillator 54 appears in its complete magnitude. Tap 265 as will be described hereinafter is connected to the lead going into the pressure chamber of this novel calibrating equipment and is intermittently keyed to ground according to the code groups or the code letters that are being played on the radiosonde disc inside of the pressure chamber of that particular unit. These code signals of the kind, for example, dot-dash, would then appear at tap 265 as a momentary open circuit, then a closed circuit and then an open circuit for a longer time so that the audio signals from audio oscillator 54 and applied at tap 132 will reach head 25 only when the particular relay connected to tap 265 is opened.

There will be eight relays for a calibrating unit using eight channels all connected to taps similar to tap 265 of the recording amplifier 50. Since these taps 265 may all be shorted to ground at the same time, they would present a fairly heavy load on the audio frequency oscillator 54 which supplies the recording heads 25 through resistances 134.

It was necessary, in other words, to design an audio oscillator 54 such that it would have a constant output even though the load were to change radically. It was found that such a constant output may be obtained with the circuit described in Figure 4 using an inverse R–C feed back 261—262 between the plate 255 of output tube 245 and the cathode 241 of the preceding tube 235.

Referring now to Figure 7 showing a block diagram of the tape recorder 10, tape 21 first passes near recording head 25 biased by radio frequency oscillator 53 and having applied to it an audio frequency signal produced by audio frequency oscillator 54. The output of the audio frequency oscillator 54 is interrupted at times by the relay 661 in pressure chamber 271. In other words, an audio frequency signal will be applied by audio frequency oscillator 54 on recording head 25 and thence on tape 21 when relay 661 in pressure chamber 271 is in the open position.

When relay 661, on the other hand, during the pause between code signals is closed, the audio frequency signal from audio frequency oscillator 54 as shown previously is shunted to ground so that the recording head 25 remains inoperative and no signal will be recorded on tape 21.

Audio frequency oscillator 54 is also connected to the recorder amplifier 50 and thence to the comparing relay 55 as described in connection with Figure 2. An audio frequency signal will reach recording amplifier 50 and, therefore, appear across the comparing relay 55 only when relay 661 in pressure chamber 271 is in its open position or, in other words, when recording head 25 is operative.

Assuming that a certain signal was recorded by recording head 25 on tape 21, it will be seen that when the recorded portion of tape 21 is moved in front of the first play back head 30, an audio signal will be amplified by the first play back amplifier 51 and applied across the comparing relay 55.

If at the particular time at which the first play back head 30 becomes operative because of the signal recorded on tape 21 another signal is admitted by relay 661 to recording head 25 and recording amplifier 50 and both signals are identical in amplitude and timing, no potential difference will exist at any time during the time length of the signal across the comparing relay 55.

If, on the other hand, there is a difference between the code sent at the first revolution and that sent at the second revolution, for a certain amount of time one of the amplifiers will be inoperaive while the other will develop across relay 55 the voltage to which it was preset in preoperation adjustment, which in this case is roughly 35 volts causing the comparing relay 55 to close immediately for an instant and to operate latching relay 275 connected to the comparing relay 55. The latching relay 275 in its turn will start a motor 276 in the code recording device 277 which will pull a recorded strip of paper tape underneath the typewriter ribbon.

The armature (not shown) of a three volt D. C. relay, part of code recording device 277 (not shown), is extended and has a point on which it pecks the paper tape (not shown) through the typewriter ribbon 120 times per second in this particular embodiment when excited with 12.6 volts A. C. through the memory device keying relay of play back channel 2.

Tape 21 after passing through the first play back head 30 will meet the second play back head 35 where the recorded signal will be amplified by amplifier 52 and recorded on the paper tape recorder 277. The magnetic tape as shown in connection with Figure 1 is pulled by means of driving system 22 consisting of a roller 47 and a shaft 48 of synchronous motor 280 (see Figure 7).

In an eight channel calibration device there will be eight synchronous motors 280 whose operation will be described hereinafter in connection with Figure 5.

As for the operation of the calibration device, referring to Figures 7 and 8, the operator watches continuously the large barometric pressure indicator 282 and upon hearing the click of the relay 275 which indicates as previously mentioned that a group has been changed in one of the eight units 10 over which the operator is watching, looks at his control panel (not shown) and will see that one of the eight lights has just gone out. Each light (not shown) corresponds to its own channel of the novel calibration device.

The operator at this point makes a mental note of the pressure at the time of comparing of the particular channel on which the relay has just operated, for example channel 3, has just finished comparing or better that channel 3 has just changed code groups.

The operator now waits for a number of seconds until the paper type tape recorder 277 completes its operation of recording the two code groups. The operator then pulls the tape out a little further and then pulls it off and writes on it the pressure and the channel number.

When this cycle is completed, the operator would throw a switch (not shown) to lock out channel 3 from future operations until the remainder of the eight channels had completed their operation.

After that, the operator will press two other switches to release the equipment to repeat the cycle for other channels.

The radiosonde calibration unit consisting of eight tape recorders 10 will have all its magnetic tape recorders 10 run in complete synchronism, each following its respective unit being tested in the pressure chamber and will have eight four-wheel printing counters operated to follow together the column of mercury 402 and set up to indicate on any one of the eight paper tapes running through the paper tape recorders 277 the actual barometric pressure existing at that time in the pressure chamber 271 so that eight strips of paper tape will be at the finger tips of the operator and two or three units 10 may compare or record at once rather than having all of them held out until a particular one is finished with its operation as mentioned above.

It is also possible to have all eight channels compare and printing down their number, for example, 1, 2, 3, 4, 5, 6, 7, and 8 and the same barometric pressure so that the operator would only have to tear them all off without even having to touch lockout switches, etc.

The procedure for pressure calibration is as follows: In an eight channel calibration device as shown in Figure 1 there will be eight lights (not shown) and eight toggle switches (not shown) for indicating and putting into or out of service the eight channels of the calibration device. Then the pressure in pressure chamber 271 containing all eight units will be reduced to a first value, for example, 230 millibars.

After the equipment has settled down, in other words, after one revolution, if there are no changes in groove positions, a slow leak is started, the eight toggle switches are switched on turning on the above-mentioned eight lights and the calibration device will run in that condition until one of the eight units changes grooves, at which time there will be a click from the latching relay 275 at which time the light corresponding to that particular radiosonde will go out. The paper tape indicating recorder 277 will start to run and to record while the leakage which has been causing slowly the change in barometric pressure in the pressure chamber 271 and which has caused the change in groove will presently stop.

At this time the rest of the system will remain inoperative except that their motors will continue to run although here will be an automatic lock-out caused by latching relay 275. The lock-out is such that any occurrence on the other channels would not become present on the visual tape recorder 277.

After a second or two the visual tape recorder 277 will print the two code groups in actual dots and dashes. The operator will then switch the toggle switch for that particular unit to lock it out permanently for the remainder of the test at that particular level of pressure and then will depress a button to start again the leakage from pressure chamber 271, thus putting the equipment back into operation ready to start a new cycle.

This test is repeated for all the eight channels at approximately every 100 millibars on a quality check whereas in routine production the number of levels of pressure where such a test is necessary is not so great.

As previously mentioned, each channel, and, therefore, each tape recorder 10 is provided with a synchronous motor 280. In other words, in an eight channel calibration device, there will be eight such synchronous motors 280. Synchronous motors 280 are driven by the synchronous amplifier 300 (see Figures 5 and 7) which in its turn is operated by an induction pick-up 301 located close to the radiosonde motor (not shown) located in the pressure chamber 271.

Induction pick-up 301 is connected in parallel to a capacitance 303 so that inductance 301 and capacitance 303 resonate at a preselected low frequency, in this particular case 45 cycles per second. The voltage developed across parallel circuit 301—303 is applied across potentiometer 304. Potentiometer center tap 306 is connected to the grid 307 of amplifier 308. Amplifier 308 is self-biased by means of resistance 309 connected between cathode 310 of tube 308 and ground and by-passed by capacitance 311.

The plate 313 of tube 308 is connected to the primary 315 of transformer 316 and thence to tap 318 of power supply 20. The secondary 320 of transformer 316 is connected to the doubler circuit 319 consisting of rectifiers 321 and 322 in push-pull.

Frequency doubling was found to be necessary because of the limitations presented by output transformers when operated at 45 cycles per second, the frequency encountered in this particular embodiment.

More specifically, secondary 320 is connected at its two terminals 323 and 324 to the plates 326 and 327 of rectifiers 321 and 322, respectively. Cathodes 328 and 329 of diodes 321 and 322, respectively, are connected to ground. The output from rectifiers 321—322 because of the push-pull arrangement will be essentially of twice the frequency of the signals applied to tube 308 and in this embodiment 2×45 or 90 cycles per second. This output is applied to the grid 330 of amplifier 332 by center tapping secondary 320 of transformer 316 and connecting the center tap to ground through leakage resistance 334. Amplifier tube 332 is biased by means of cathode resistor 335 connected between cathode 336 of tube 332 and ground by-passed by capacitor 337.

Plate 339 of tube 332 is connected to tap 318 of power supply 20 through primary 340 of transformer 341. Secondary 342 of transformer 341 has one of its terminals 344 connected to resistance 345 and thence to control grid 347 of amplifier 348. Terminal 344 is also connected to ground through resistance 349 so that the signal appearing at the input of tube 348 will be in phase with that of secondary 342 of transformer 341.

Tube 348 is self-biased by means of resistance 350 connected between cathode 352 and ground by-passed by capacitance 354.

Similarly, cathode 356 of tube 357 is connected to ground through resistor 359 and by-passed to ground through capacitance 360 to provide a self-bias to tube 357.

But the other terminal 361 of secondary 342 of transformer 341, while connected to grid 362 of tube 357 through resistance 364, is connected to ground through a capacitor 365 so that the input signal in tube 357 will be 90° out of phase with respect to the one appearing at secondary 342 of transformer 341 and, therefore, also 90° out of phase with respect to the signal appearing at the input of tube 348. Consequently, also the outputs of tubes 348 and 357 will be 90° out of phase.

Screen grids 365 and 366 of tubes 348 and 357, respectively, are connected to tap 367 of D. C. power supply 20, while suppressor grids 368 and 369 of the same tubes are connected to cathodes 352 and 356, respectively.

Plate 371 of tube 348 is connected to a tuned circuit 372 consisting of an inductance 373 in parallel with a capacitance 375. Circuit 372 is tuned at the center frequency of operation of 90 cycles per second in this embodiment.

Similarly, plate 376 is connected to a circuit 377 consisting of an inductance 379 in parallel with a capacitance 380 tuned also to 90 cycles per second in this particular embodiment. The output voltages appearing across tuned circuits 372 and 377 are 90° out of phase or better the output across tuned circuit 372 of tube 348 is 90° out of phase with respect to the voltage across tuned circuit 377 of tube 357 due to the existence of capacitance 365 in the grid circuit of tube 357 and the existence of a resistance 349 in grid circuit of tube 348 since the voltage across a resistance is 90° ahead with respect to that appearing across a capacitance through which the same current flows.

The two tubes 348 and 357 are power tubes, for example 6V6, so that considerable power appears at the secondaries 382 and 383 of output transformers 384 and 385 of which coils 373 and 379, respectively, are the primaries. These transformers 384 and 385 serve to drive two-phase synchronous motors 280.

In this particular embodiment the maximum and minimum frequencies fed into the synchronous amplifier 300 were determined to be 39.98 cycles per second and 51.2 cycles per second. These frequencies are the maximum and minimum which could be expected from a normally operating radiosonde motor for 10–13 R. P. M. drive speed of the record.

Figures 5, 6:
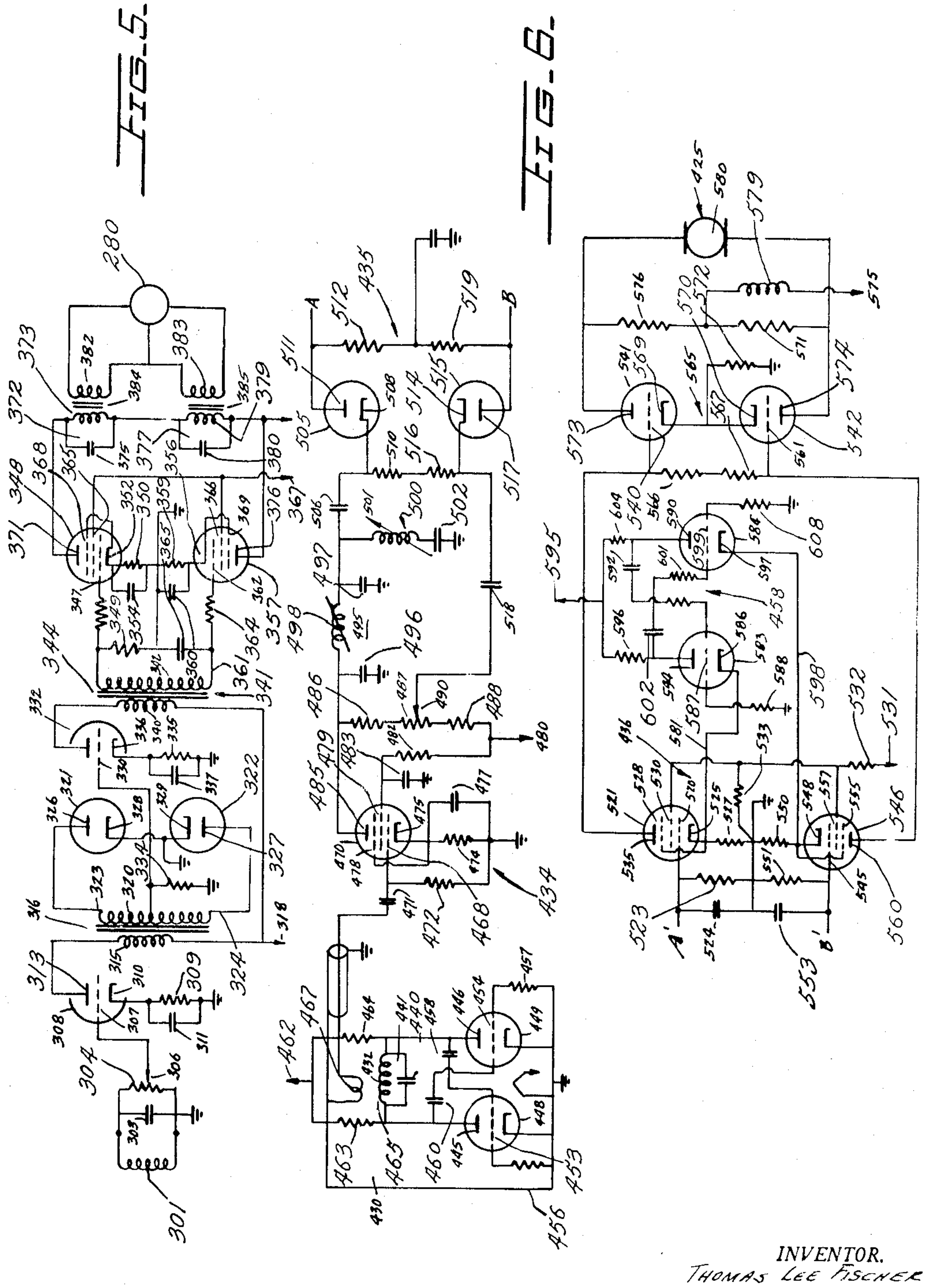
Figure 5 is a schematic diagram of the synchronous amplifier for the radiosonde calibration equipment of Figure 1.
Figure 6 is a schematic diagram of the manometer follow-up device of the radiosonde calibration equipment of Figure 1.

Referring next to Figures 8 and 6 showing, respectively, a partly schematic diagram of the novel manometer follow-up device and the schematic diagram of the electrical circuit of the novel manometer follow-up device, mercury 400 fills partially cylindrical vessels 402 and 403 and a common vessel 405. Tube 403 is open at its top to ambient pressure while tube 402 is connected by means of appropriate holes 404 to the pressure chamber 271 in which the test is performed. The pressure may also be observed by means of a pressure dial indicator 412 mounted on stand 413 of barometer 410. Vessels 402, 403 and 405 are mounted on stand 413 in any suitable way, for example, by bolted brackets 415.

Mounted on vessel 403 for longitudinal motion on vessel 403 is a carriage 417 which is provided with an internally threaded cylindrical opening 418 engaged by lead screw 420 at the one end of which is a gear 421.

Gear 421 is internally threaded and engages screw 420 which does not turn on rotation of gear 421 but will move longitudinally in the direction of the mercury column 403. Gear 421 is moved by means of gear 422 turned by the drive motor 425 and by gear 424 operated by selsyn motor 426. The manometer follow-up motor 425 is secured by any siutable means on a base (not shown) of manometer 410.

Rotation of motor 425 causes, therefore, longitudinal motion of screw 420 through gears 422—424—421 so that carriage 417 will be moved upwardly or downwardly to follow the variation in height of mercury column 400 in vessel 403 due to variation in pressure of the secondary ambient.

Motor 425 is rotated whenever the frequency of oscillation of oscillator 430 mounted on carriage 417 changes due to variation of mercury position in oscillator coil 432. The output from oscillator 430 is applied to an amplifier 434, then to a detector 435 to be amplified again at D. C. amplifier 436 and finally applied to motor 425. To overcome friction in gears 421—424—422 and carriage 417, an anti-friction circuit 438 causes the motor 425 to rock back and forth by very small amounts as described more in detail hereinafter.

Rotation of motor 425 will cause as previously mentioned a motion of carriage 417 along the vessel 403 so that the top of the mercury column 403 is always closely followed by carriage 417.

It is here necessary to point out that circuits 434, 435, 436 and 438 are mounted in back of manometer 410 in a rack or stand.

As previously mentioned, mercury tube 403 is exposed to ambient pressure at the top while tube 402 is connected by means of a hose 404 from the top of the tube 402 to the evacuated or pressurized chamber 271 (see Figure 7) in which radiosondes are located when under test. It is evident that means for compensating for ambient pressure changes has to be provided. An ambient compensator motor 411 is provided, in fact, at one end of manometer 410 which is manually controlled by the operator. Motor 411 by means of gears (not shown) moves the mercury tubes 402 and 403 in the vertical direction. Tubes 402, 403 are moved until the manometer dial 412 indicates proper ambient pressure as determined by an accurate and separate barometer (not shown).

With the manometer 410 set as explained above, one millibar of movement of the lead screw 420 in the vertical direction will produce a one millibar change in the reading of dial 412, and the manometer 410 will be correct at any pressure provided for by the length of tubes 402 and 403, in this particular embodiment, for example, from 200 to 1,050 millibars.

Referring now to Figure 6 showing a detailed circuit diagram of the manometer follow-up device of this invention, oscillator coil 432 is the coil forming in conjunction with parallel capacitance 440 a tuned circuit 441 anti-resonant at a preselected frequency of, for example, 102.5 kilocycles, from now on referred to as center frequency, when the mercury 400 in vessel 403 is at a certain preselected position with respect to coil 432 in carriage 417.

Any change in position of mercury 400 in vessel 403 and, therefore, with respect to coil 432 causes a change of inductance in tuned circuit 441 and thus a change in the resonant frequency of circuit 441 resulting in a variation of frequency of oscillator 430.

Oscillator 430 consists as above mentioned of a tank circuit 441 connected between the plates 445 and 446 of oscillator tubes 448 and 449. Tubes 448 and 449 have their cathodes 451 and 452, respectively, connected to ground while their grids 453 and 454, respectively, are connected to grid leak resistances 456 and 457, respectively. Grid 453 of tube 448 is further capacitively coupled to the plate 446 of tube 449 by capacitance 458, while grid 454 of tube 449 is capacitively coupled to plate 445 of tube 448 through capacitance 460.

As previously mentioned, plates 445 and 446 of tubes 448 and 449, respectively, are also connected to opposite sides of tuned circuit 441. Furthermore, plates 445 and 446 are connected to D. C. power supply 462 through load resistances 463 and 464, respectively.

Coil 432 of tuned circuit 441 is also the primary of a coupling transformer 465 having its secondary 467 connected to ground on one side and to the grid 468 of amplifier tube 470 through coupling capacitance 471. Grid 468 is grounded through grid leak resistance 472 and biased by means of resistor 474 connected between cathode 475 of tube 470 and ground where resistor 474 is by-passed to ground by capacitance 477.

Suppressor grid 478 is connected to cathode 475 while screen grid 479 is connected to power supply tap 480 through a dropping resistor 482 and by-passed to ground through capacitance 483.

Plate 485 of tube 490 is connected to power supply 480 through series connected resistors 486, 487 and 488 where resistor 487 is actually a potentiometer having a movable tap 490.

Output from plate 485 of tube 470 is applied to a low pass filter consisting in this particular embodiment of a pi network 495 having capacitances 496 and 497 as its outer vertical legs and variable inductance 498 as the horizontal or center leg. In this particular embodiment, filter 495 is tuned at 97 kilocycles.

Immediately following pi network 495 is a series circuit 500 consisting of a variable inductance 501 and a capacitance 502. Series circuit 500 is connected between capacitance 497 and inductance 498 at one end and to ground at the other end and is tuned to 117 kilocycles in this particular embodiment.

Networks 495 and 500 are connected to a detector tube 505 through a capacitance 506 connected to the cathode 508 of diode 505. Cathode 508 of diode 505 is connected to resistance 510, while plate 511 of diode 505 is connected to center point through another resistance 512.

The low pass filter 495 was so designed that variations in the frequency of oscillation of oscillator 430 due to the movement of mercury 400 in oscillator coil 432 would cause a varying voltage at the detector 505. It is known, in fact, that a tuned circuit may be used to transform frequency variations into amplitude variations and such amplitude variations may then be easily detected as is presently done by the use of the diodes.

Top 490 of potentiometer 487 is connected to the cathode 514 of diode 515 through capacitor 518 and also to resistance 510 through resistance 516. Plate 517 of diode 515 is connected to a resistance 519 which is also connected to resistance 512. Tap 490 serves to apply a reference voltage taken from the load resistance 486—487—488 of tube 470 and apply that reference voltage to the second diode detector 515. It is obvious that diodes 505 and 515 may actually be the two halves of a double diode tube, for example, the 6AL5.

The voltage obtained at diode 515 is used so that variations in the output of oscillator 430 do not affect the overall results of the system because, for example, at the same time that the voltage is reduced on the side of the low pass filter 495, the voltage will also be reduced on the side of the reference voltage, causing an equalizing effect at the output of the diodes 505 and 515 or, in other words, at resistances 512 and 519 and resistances 523 and 551.

The configuration of filter 495 and diodes 505—515 is such that the voltage at points A′ and B′ can reverse in polarity with respect to ground. For the highest frequency from oscillator 430, the voltages at A′ and B′ to ground will be equal and opposite to that voltage applied when oscillator 430 is at its lowest frequency. At center frequency there will be no voltage difference applied.

The outputs from these diodes 505 and 515 constituting detector system 435 are taken at A and B and applied at A′ and B′ to the input side of the push-pull D. C. voltage amplifier 436.

More specifically, terminal A′ is connected to the grid 520 of tube 521 and the push-pull amplifier 436. Grid 520 is connected to ground through the parallel combination of resistance 523 and capacitance 524. Cathode 525 of tube 521 is biased above ground by means of resistance 527 connected between cathode 525 and ground. Suppressor grid 528 is connected to the cathode 525 of tube 521. Screen grid 530 is connected to a D. C. power supply 531 through a dropping resistance 532. Screen grid 530 is also connected to ground through another resistance 533. The plate 535 of tube 521 is directly coupled into the grid 540 of power output tube 541 in push-pull with power output tube 542.

Terminal B′ is connected similarly to the control grid 545 of the other tube 546 of push-pull amplifier 436. Tube 546 has its cathode 548 biased above ground by means of a resistance 550 connected between cathode 548 and ground. Grid 545 is connected to ground through a parallel combination of resistance 551 and capacitance 553. Suppressor grid 555 of tube 546 is connected to its cathode 548 while its screen grid 557 is connected to power supply 531 through the dropping resistance 532.

Plate 560 of tube 546 is directly coupled to the grid 561 of tube 542 which together with tube 541 form a power push-pull amplifier 565. Grids 540 and 561 of tubes 541 and 542, respectively, are connected to a positive potential at cathode through resistances 566 and 567 and 572, respectively, while their cathodes 569 and 590, respectively, are connected to ground through a biasing resistance 572. Plates 573 and 574 of tubes 541 and 542, respectively, are connected to power supply 575 through resistance 576 and resistance 577, respectively, and through field coil 579 of follow-up manometer motor 425.

The armature 580 of motor 425 is connected directly to the two plates 573 and 574 of power push-pull amplifiers 541 and 542. Since tubes 541 and 542 are operated at class A, a continuous current is being drawn through field coil 579 at all times, giving the motor maximum starting torque. The voltage from tubes 541 and 542 is applied to armature 580 of motor 425 through the previously mentioned load resistances 576 and 577. Resistances 576 and 577 provide a dampening effect to the armature so that hunting is reduced considerably.

As for the operation of D. C. amplifiers 521—541 and 546—542 forming the D. C. power amplifier 437 (see Figure 8) when tube 521 has applied to its grid 520 a maximum negative potential, tube 541 will have a potential difference between its grid 540 and its cathode 569 resulting in maximum plate current and, therefore, in a low potential at the plate 573 of tube 541. At the same time, the grid 545 of tube 546 will have a positive potential causing a large negative potential between the grid 561 and the cathode 570 of tube 542, resulting in minimum plate current, thus making plate 574 assume a large positive potential so that a large potential difference of a particular polarity will now be applied to the armature 580 of motor 425. If the voltages applied to the grids 520 and 545 of tubes 521 and 546, respectively, should reverse in polarity, the opposite large potential would be applied to the armature 580 of motor 425. With equal potentials of the same polarity or also with zero potential applied to the grids 520 and 545 of tubes 521 and 546, respectively, there will be no potential difference applied to the armature 580 of motor 425. These variations in potentials applied to the grids 520 and 545 of tubes 521 and 546, respectively, result from the highest, the lowest and center frequency of oscillation, respectively, of oscillator 430.

Returning to voltage push-pull amplifier 436, it will be noted that low frequency pulses are applied to cathode 525 of tube 521 of push-pull amplifier 436 through conductor 581. These pulses are generated by the anti-friction circuit 438 which is essentially a multi-vibrator oscillator.

Anti-friction circuit 438 consists of tubes 583 and 584 where tube 583 has its cathode 586 connected to the previously mentioned conductor 581 and thence to the cathode 525 of push-pull amplifier tube 521. The grid 587 of tube 583 is connected to ground through a resistance 588 and is connected to the plate 590 of the second multi-vibrator tube 584 through the series combination of resistance 591 and capacitance 592.

Plate 594 of first multi-vibrator tube 583 is connected to a power supply 595 through a load resistance 496. Similarly, cathode 597 of second multi-vibrator tube 584 is connected through conductor 598 to the cathode 548 of the second push-pull amplifier tube 546. The grid 599 of the second multi-vibrator tube 584 is connected to ground through resistance 600 and is connected to the plate 594 of first multi-vibrator tube 583 through a series combination of resistance 601 and capacitance 602. Plate 590 is connected to the D. C. power supply 595 through another load resistance 604.

The operation of the multi-vibrator circuit forming the anti-friction circuit 438 is well-known in the art. Its function is to deliver pulses through conductors 581 and 598 to the cathodes 524 and 548 of push-pull amplifiers 521 and 546, respectively, so that these pulses which will be positive and negative will then be applied through the previously described circuits to the motor 425 causing it to oscillate back and forth by very small amounts in order to overcome friction in the gears 421—422—424 and carriage 417.

Referring again to the oscillator circuit 430, it was found that the maximum frequency deviation due to mercury displacements is plus or minus 2½% from the center frequency, which in this particular embodiment was 102½ kilocycles.

The oscillator circuit 430 has been designed to have a minimum amount of drift due to heating and eventual voltage changes. Feed back capacitors 458 and 460 of oscillator 430 are adjusted together with the grid resistances 556 and 557 and the output resistances 463 and 464 so that any eventual voltage change will produce a minimum amount of frequency deviation.

Typical values and designations for the circuit elements of Figures 2, 3, 4, 5 and 6 are as follows:

*Figure 2*

| | | |
|---|---|---|
| Capacitances: | | |
| 57 | microfarads | 0.5 |
| 70 | do | 0.01 |
| 74 | do | 0.001 |
| 76 | do | 0.25 |
| 78 | do | 0.001 |
| 90 | do | 0.01 |
| 94 | micromicrofarads | 500 |
| 97 | do | 200 |
| 107 | microfarads | 0.01 |
| 112 | do | 0.01 |
| 126 | do | 0.1 |
| 130 | do | 0.01 |
| 149 | do | 0.01 |
| 153 | do | 0.01 |
| 179 | do | 0.1 |
| Resistances: | | |
| 61 | kilo-ohms | 1.0 |
| 67 | megohms | 2.0 |
| 69 | do | 0.1 |
| 72 | do | 0.51 |
| 79 | do | 1.0 |
| 84 | kilo-ohms | 1.5 |
| 88 | megohms | 2.0 |
| 92 | do | 0.51 |
| 98 | do | 3.9 |
| 100 | kilo-ohms | 1.5 |
| 105 | megohms | 2.0 |
| 109 | do | 0.51 |
| 114 | do | 3.9 |
| 117 | kilo-ohms | 2.0 |
| 123 | do | 10.0 |
| 134 | do | 47.0 |
| 135 | do | 47.0 |
| 137 | megohms | 1.0 |
| 142 | kilo-ohms | 1.5 |
| 148 | megohms | 2.0 |
| 152 | do | 0.51 |
| 155 | kilo-ohms | 3.9 |
| 163 | do | 10.0 |
| 174 | do | 10.0 |
| Tubes: | | |
| 60 | | 6AG5 |
| 81 | | 6AG5 |
| 96 | | 6AG5 |
| 111 | | 6C4 |
| 140 | | 6AG5 |
| 157 | | 6C4 |
| 170 | | 6C4 |

*Figure 3*

| | | |
|---|---|---|
| Capacitances: | | |
| 182 | microfarads | 0.0025 |
| 198 | do | 0.01 |
| 204 | do | 0.004 |
| 207 | do | 0.001 |
| 208 | do | 0.001 |
| Resistances: | | |
| 190 | ohms | 250 |
| 191 | kilo-ohms | 1.0 |
| 195 | do | 10.0 |
| Tubes: | | |
| 185 | | 6V6 |
| 186 | | 6V6 |

*Figure 4*

| | | |
|---|---|---|
| Capacitances: | | |
| 217 | microfarads | 0.01 |
| 222 | do | 0.005 |
| 231 | do | 0.25 |
| 237 | do | 0.01 |
| 247 | do | 0.01 |
| 253 | do | 100 |
| 258 | do | 1.0 |
| 261 | do | 0.1 |
| Resistances: | | |
| 223 | kilo-ohms | 50 |
| 226 | do | 1.0 |
| 230 | do | 20.0 |

*Resistances.*—Continued.

| | | |
|---|---|---|
| 238 | megohms | 0.5 |
| 242 | kilo-ohms | 2.0 |
| 248 | megohms | 0.5 |
| 250 | do | 0.1 |
| 252 | ohms | 450 |
| 255 | kilo-ohms | 4.0 |
| 260 | do | 10.0 |
| 262 | do | 47.0 |

Tubes:

| | |
|---|---|
| 220 | ½ 6SN7 |
| 230 | ½ 6SN7 |
| 245 | 6V6 |

*Figure 5*

Capacitances:

| | | |
|---|---|---|
| 303 | microfarads | 0.25 |
| 311 | do | 25 |
| 337 | do | 25 |
| 354 | do | 25 |
| 360 | do | 25 |
| 365 | do | 0.005 |
| 375 | do | 1.0 |
| 380 | do | 1.0 |

Resistances:

| | | |
|---|---|---|
| 304 | megohms | 1.0 |
| 309 | kilo-ohms | 4.7 |
| 334 | do | 220.0 |
| 335 | do | 4.7 |
| 349 | do | 390 |
| 345 | do | 180 |
| 350 | ohms | 350 |
| 359 | do | 350 |
| 364 | kilo-ohms | 180 |

Tubes:

| | |
|---|---|
| 308 | ½ 6SN7 |
| 321 | ½ 6AL5 |
| 322 | ½ 6AL5 |
| 332 | ½ 6SN7 |
| 348 | 6V6 |
| 357 | 6V6 |

*Figure 6*

Capacitances:

| | | |
|---|---|---|
| 440 | micromicrofarads | 1500 |
| 458 | do | 55 |
| 460 | do | 160 |
| 471 | do | 15 |
| 477 | microfarads | 0.01 |
| 483 | do | 0.01 |
| 496 | do | 200 |
| 497 | do | 100 |
| 502 | do | 100 |
| 524 | do | 0.01 |
| 553 | do | 0.01 |
| 592 | do | 0.1 |
| 602 | do | 0.1 |
| 518 | do | 0.25 |

Resistances:

| | | |
|---|---|---|
| 456 | kilo-ohms | 250 |
| 457 | do | 250 |
| 463 | do | 15 |
| 464 | do | 15 |
| 472 | do | 150 |
| 474 | do | 2.2 |
| 482 | do | 100 |
| 486 | do | 9.5 |
| 487 | do | 1.0 |
| 488 | do | 14.0 |
| 510 | do | 15 |
| 512 | do | 150 |
| 516 | do | 15 |
| 519 | do | 150 |
| 523 | do | 220 |
| 527 | ohms | 150 |
| 532 | kilo-ohms | 100 |
| 533 | do | 10 |
| 550 | ohms | 150 |
| 551 | kilo-ohms | 220 |
| 566 | do | 200 |
| 567 | do | 200 |
| 572 | ohms | 930 |
| 576 | kilo-ohms | 1.25 |
| 577 | do | 1.25 |
| 588 | do | 470 |
| 591 | do | 120 |
| 596 | do | 50 |
| 600 | do | 470 |
| 601 | do | 120 |
| 604 | do | 50 |

Tubes:

| | |
|---|---|
| 448 | ½ 6BG7 |
| 449 | ½ 6BG7 |
| 470 | 6AU6 |
| 505 | ½ 6AL5 |
| 515 | ½ 6AL5 |
| 521 | 6AU6 |
| 541 | 6AS7 |
| 542 | 6AS7 |
| 546 | 6AU6 |
| 583 | ½ 6BQ7 |
| 584 | ½ 6BQ7 |

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a radiosonde calibration device comprising a visual pressure indicating instrument, a pressure responsive fluid column, the height of said fluid column changing with variations of pressure in conjunction with indications in said visual indicating instrument, means for recording said variations in height in said fluid column, a carriage movable along said column, said means being mounted on said carriage, an oscillator also mounted on said carriage, said oscillator comprising an oscillator coil, said coil being wound loosely around said column, the frequency of oscillation of said oscillator being a function of the amount of fluid enclosed by said coil, an amplifier for amplifying the output from said oscillator, a filter circuit connected to the output of said amplifier for transforming the amplified frequency variations of said oscillator into amplitude variations, a detector connected to the output of said filter and detecting the amplitude modulated signals from said filter, means compensating the variations in amplitude of the output signals from said oscillator, an amplifier stage being connected to the output of said diode detector and said compensating means, a second stage of amplification directly coupled to the output of said first stage of amplification, a follow-up motor for moving said carriage together with said fluid at variations of pressure, the windings of said follow-up motor being connected to the output of said direct coupled amplifier, means overcoming the friction of said carriage and of said mechanical coupling means, said means comprising a multi-vibrator circuit, the output from said multi-vibrator circuit being applied to the first stage of said direct coupled amplifiers, said multi-vibrator causing said follow-up motor to move back and forth to overcome the friction of said carriage and of said mechanical coupling means.

2. In combination a first movable member, a motor and operating circuit for said motor, a connection from said first movable member for controlling the supply of energy for said motor operating circuit as said movable member moves to cause said motor to follow the movement of said movable member, means for overcoming the friction of said movable member, said means comprising a multivibrator circuit, the output from said multivibrator circuit being applied to said motor operating circuit causing the said motor to move back and forth to overcome its static friction.

3. In combination a movable member, a motor, an operating circuit for said motor, a connection between said movable member and said operating circuit for controlling the supply of energy for said motor operating circuit as said movable member moves to cause said motor to follow the movement of said movable member, means for overcoming the static friction of said motor, said means comprising a low frequency multivibrator, said multivibrator causing said follow up motor to move back and forth at the said low frequency to overcome its static friction.

References Cited in the file of this patent

UNITED STATES PATENTS

| | | |
|---|---|---|
| 1,711,101 | Shanck | Apr. 30, 1929 |
| 2,334,704 | Hilferty | Nov. 23, 1943 |
| 2,357,745 | Kliever | Sept. 5, 1944 |
| 2,532,723 | Knoop | Dec. 5, 1950 |
| 2,621,518 | Sontheimer | Dec. 16, 1952 |
| 2,623,112 | Adelson | Dec. 23, 1952 |

OTHER REFERENCES

"Atomatic Calibration of Radiosonde Baroswitches," Electronics, May 1951, vol. 24, issue 5, pgs. 123–129.